United States Patent
Appleyard et al.

(10) Patent No.: US 7,793,838 B2
(45) Date of Patent: Sep. 14, 2010

(54) MULTI-CHANNEL PURCHASE TRANSACTION

(75) Inventors: James P. Appleyard, North Richland Hills, TX (US); Chang-Ren He, Plano, TX (US); Shiju Mathai, Carrolton, TX (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/278,692

(22) Filed: Apr. 5, 2006

(65) Prior Publication Data
US 2007/0235527 A1    Oct. 11, 2007

(51) Int. Cl.
*G06K 5/00* (2006.01)
*G06K 15/00* (2006.01)

(52) U.S. Cl. ........................ 235/383; 235/382
(58) Field of Classification Search ................. 235/383, 235/382, 380, 375, 382.5; 705/26
See application file for complete search history.

(56) References Cited

U.S. PATENT DOCUMENTS

| | | | |
|---|---|---|---|
| 6,679,421 B2 * | 1/2004 | Shin et al. | 235/375 |
| 6,873,968 B2 | 3/2005 | Ehrlich et al. | |
| 7,177,825 B1 * | 2/2007 | Borders et al. | 705/26 |
| 7,181,418 B1 * | 2/2007 | Zucker et al. | 705/26 |
| 7,472,081 B1 * | 12/2008 | Cason | 705/26 |
| 2001/0042515 A1 * | 11/2001 | Gallagher et al. | 119/14.03 |
| 2002/0133466 A1 * | 9/2002 | Pugh | 705/64 |
| 2002/0143660 A1 * | 10/2002 | Himmel et al. | 705/27 |
| 2002/0162009 A1 * | 10/2002 | Shmueli et al. | 713/200 |
| 2003/0046172 A1 * | 3/2003 | Himmel et al. | 705/26 |
| 2003/0139974 A1 | 7/2003 | Lee | |
| 2008/0004988 A1 * | 1/2008 | Cue et al. | 705/26 |
| 2009/0043674 A1 * | 2/2009 | Minsky et al. | 705/27 |
| 2009/0167553 A1 * | 7/2009 | Hong et al. | 340/825.29 |

FOREIGN PATENT DOCUMENTS

WO    WO0190984 A1    11/2001

* cited by examiner

*Primary Examiner*—Thien M Le
(74) *Attorney, Agent, or Firm*—Cuenot, Forsythe & Kim, LLC

(57) ABSTRACT

A method for conducting a sales transaction. The method can include receiving at a terminal within a store a first identifier generated for a first item of merchandise selected by a customer while the customer is located within the store. The method also can include receiving from a virtual shopping cart a second identifier generated for a second item of merchandise. The first identifier and the second identifier can be processed in the sales transaction.

20 Claims, 2 Drawing Sheets

US 7,793,838 B2

MULTI-CHANNEL PURCHASE TRANSACTION

BACKGROUND OF THE INVENTION

1. Field of the Invention

The present invention relates to Internet transactions and, more particularly, to virtual shopping carts.

2. Description of the Related Art

Retail sales over the Internet have continued to grow significantly over the last several years. One mechanism commonly implemented to facilitate such retail sales is a virtual shopping cart. A virtual shopping cart tracks items selected by a consumer for on-line purchase while allowing the consumer to continue shopping for additional items. When the consumer is done shopping, the consumer is presented with a list of the selected items contained in the virtual shopping cart and given an opportunity to purchase such items in a single transaction.

Oftentimes, the consumer may be interested in a particular item, but not ready to purchase the item without having the opportunity to personally inspect it. Thus, the consumer may forego purchasing the item on-line, instead opting to shop at a conventional retail store. Unfortunately, the consumer may sometimes find that the item in which she is interested is not in stock. In consequence, much time may be wasted traveling to and from a retail store without being able to make a desired purchase.

SUMMARY OF THE INVENTION

The present invention relates to a method for conducting a sales transaction. The method can include receiving at a terminal within a store a first identifier generated for a first item of merchandise selected by a customer while the customer is located within the store and, responsive to identifying the user within the store, requesting from a virtual shopping cart associated with the user a list comprising at least a second identifier specifying a second item of merchandise previously selected by the user for purchase online. The method also can include receiving from the virtual shopping cart the list comprising the at least a second identifier specifying the second item of merchandise. The first item of merchandise and the second item of merchandise can be processed in a single sales transaction.

The present invention also relates to a system for conducting a sales transaction. The system can include a terminal within a store that receives a first identifier generated for a first item of merchandise selected by a customer while the customer is located within the store and, responsive to identifying the user within the store, requests from a virtual shopping cart associated with the user a list comprising at least a second identifier specifying a second item of merchandise previously selected by the user for purchase online. The terminal also can receive from the virtual shopping cart the list comprising the at least a second identifier specifying the second item of merchandise. The terminal can process the first item of merchandise and the second item of merchandise in a single sales transaction.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to a method and a system for combining on-line shopping via a communications network, such as the Internet, and in-person shopping within a store. In particular, items of merchandise (hereinafter "items") identified in a customer's virtual shopping cart can be combined with items selected by the customer while the customer is located within the store. Checkout of such items then can be processed in a single transaction.

The ability of the customer to shop on-line is useful for determining whether desired items are presently available for purchase prior to the customer traveling to the store. For example, items added to the customer's virtual shopping cart can be allocated to the customer and removed from the store's available inventory. After arriving at the store, the customer can be provided opportunity to personally inspect items selected on-line prior to completing the purchase transaction. Further, store sales representatives can be given opportunity to show to the customer alternative items available for purchase. If the customer decides not to proceed with the purchase of any of the items contained in the virtual shopping cart, such items can be removed from the virtual shopping cart and returned to the store's available inventory.

Figure 1:
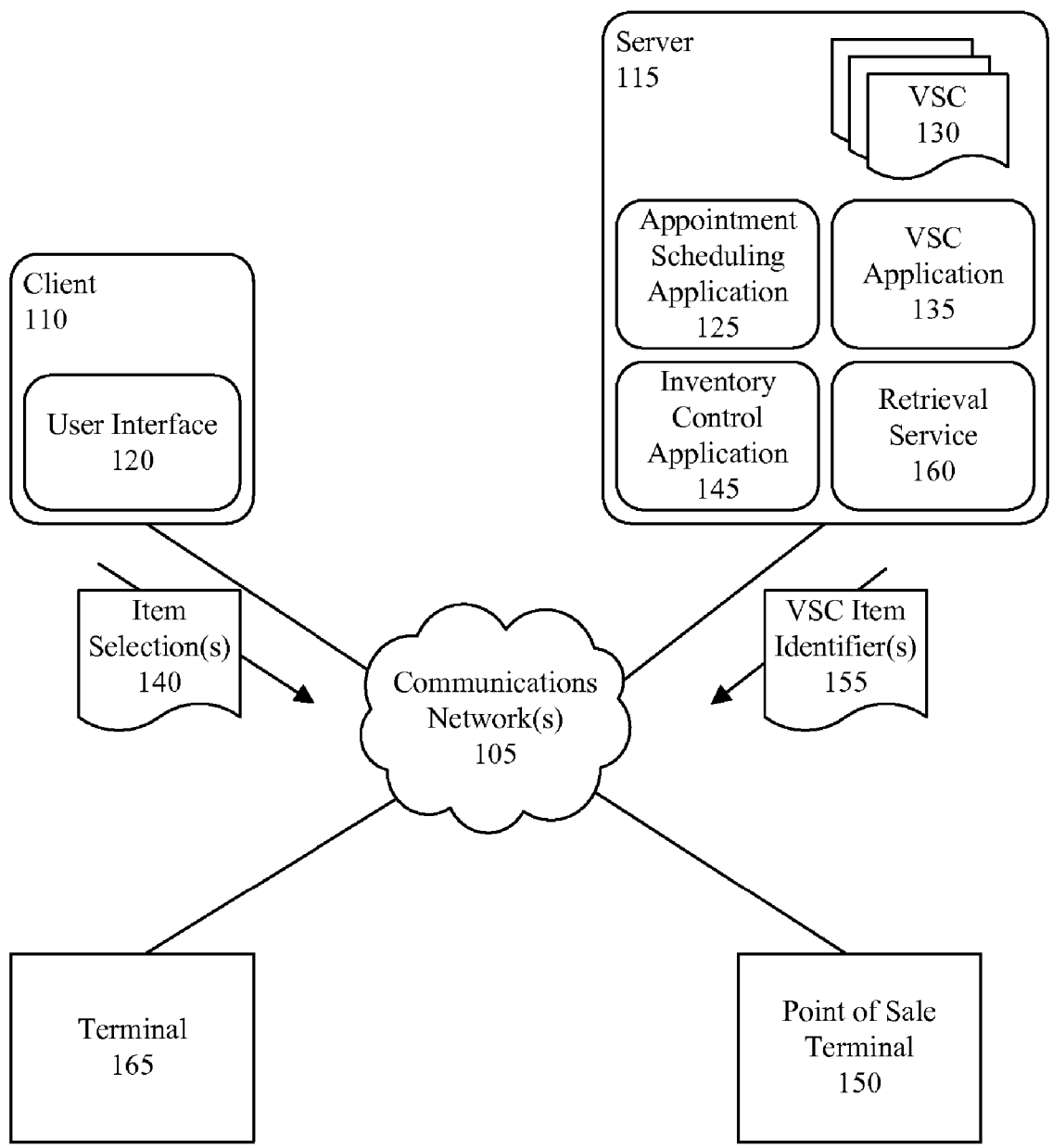
FIG. 1 is a block diagram depicting a purchase transaction system in accordance with an embodiment of the present invention.

FIG. 1 is a block diagram depicting a purchase transaction system (hereinafter "system") 100 in accordance with an embodiment of the present invention. The system 100 can include a client 110 that communicates with a server 115 via a communications network 105. The communications network 105 can be, for example, the Internet, the World Wide Web, an intranet, a wide area network (WAN), a local area network (LAN), a cellular communications network, or any other communications network suitable for communicating digital data. As such, the communications network 105 can include wired and/or wireless communication links.

The client 110 can be an application executing on a processing system which is communicatively linked to the communications network 105. For example, the client 110 can be a network browser or other communications application executing on a computer, a personal digital assistant (PDA), a mobile station (e.g. a mobile telephone), an internet appliance, or any other processing system suitable for exchanging data via the communications network 105. The client 110 can include a user interface 120 for receiving customer selections of merchandise for purchase. The user interface 120 can be, for example, a graphical user interface.

The user interface 120 also can be used by a customer to request an in-store appointment, for example to meet with a sales representative or to schedule a sales transaction. An appointment scheduling application 125 can be provided to schedule appointments in accordance to such appointment requests. The appointment scheduling application 125 can be instantiated on the server 115 or otherwise communicatively linked to the client 110.

The sever 115 can provide to the client 110 access to at least one virtual shopping cart 130. As used herein, a "virtual shopping cart" is a listing of one or more items of merchandise selected by a customer, the item selections being digitally received from the client 110 and stored in digital form. The virtual shopping cart 130 can be stored in a database, a text file, or stored in any other suitable manner. A virtual shopping cart application (hereinafter "VSC application") 135 can interface with the client 110 to receive item selections 140 from the customer and add such item selections 140 to the virtual shopping cart 130. The VSC application 135 can be, for example, a web based application with which the client 110 interfaces while the customer is shopping via the communications network 105.

The VSC application 135 can interface with an inventory control application 145 that adjusts available store inventory based, at least in part, on the item selections 140 and subsequent purchases. For example, when a particular item is added to a customer's virtual shopping cart 130, the quantity of such items that are identified as being available for purchase can be reduced by one. Similarly, when an item is removed from a virtual shopping cart 130 without being purchased, the quantity of such items that are identified as being available for purchase can be increased by one. The inventory control application also can track other inventory parameters and the invention is not limited in this regard. The inventory control application 145 can be instantiated on the server 115 or otherwise communicatively linked to the server 115.

The system 100 also can include a point of sale terminal 150. The point of sale terminal 150 can be communicatively linked to the server 115 via the communications network 105, or via another communications network with which the server 115 is communicatively linked. When a customer wishes a sales transaction to be initiated, the customer can present an identifier to a cashier for entry into the point of sales terminal 150, or enter her identifier directly into the point of sales terminal 150. The identifier can be contained on a magnetic storage medium, an optical storage medium, an electronic storage medium and/or any other suitable storage medium. For example, the identifier can be contained on a card having a storage medium contained thereon. Alternatively, the identifier can comprise an alphanumeric code that is entered into the point of sales terminal 150, for example via a keypad.

After receiving the customer identifier, the point of sale terminal 150 can receive from the server 115 identifier(s) 155 for items contained in the virtual shopping cart 130 that is associated with the customer's identifier. The point of sale terminal 140 can access a virtual shopping cart retrieval service (hereinafter "retrieval service") 160 which retrieves the identifier(s) 155 from the virtual shopping cart 130. The retrieval service 160 can be, for example, a Java application. The retrieval service 160 can be instantiated on the server 115 or otherwise communicatively linked to the server 115 in a manner which provides the retrieval service access to retrieve the identifier(s) 155 from the virtual sales cart 130.

In an alternate arrangement, the virtual shopping cart 130 can be stored onto a portable storage device in addition to, or in lieu of, being stored on the server 115. For example, the virtual shopping cart 130 can be stored on a card comprising a magnetic storage medium, an optical storage medium, an electronic storage medium and/or any other suitable storage medium. In such an arrangement, the customer can present her portable storage device to a cashier or to the point of sale terminal 150 when the customer is ready to initiate a purchase transaction for items contained on the portable storage device.

After receiving the identifiers 155, the customer can be queried as to whether she wishes to purchase each of identified items. Items can be removed from the virtual shopping cart 130, saved in the virtual shopping cart 130 for later purchase, or selected for immediate purchase. Once an item is purchased, such item can be removed from the virtual shopping cart.

In addition, identifiers for any items selected for purchase by the customer while the customer is located in the store can be processed. For example, the items selected for purchase can be carried to the point of sale terminal 150 and their bar codes scanned. Alternatively, item identifiers can be entered into the point of sale terminal 150 via a keypad or in any other suitable manner.

The identifiers for items selected by the customer while in the store can be processed with the identifiers 155 from the virtual shopping cart 130 in a single sales transaction, although multiple sales transactions also can be performed. Purchased items can be delivered to the customer in any suitable manner. For example, such items can be delivered to a specific location within the store, for instance to the point of sale terminal 150 or to a pick-up counter, or delivered to a customer provided address.

The system also can include a second terminal 165. In one arrangement, the terminal 165 can be a kiosk that includes an application executing on a processing system that is communicatively linked to the communications network 105. The kiosk can be, for instance, located within the store. The kiosk can provide a customer access to add and remove items from her virtual shopping cart 130.

In another arrangement, the terminal 165 can be a device comprising a scanner. For example, the terminal 165 can be a mobile communication device that includes the scanner. The scanner can be used by the customer to scan product codes for items to be added or removed from her virtual shopping cart 130 while shopping within the store.

In an arrangement in which the virtual shopping cart 130 is stored on the server 115, the terminal 165 can be communicatively linked to the server 115 via the communications network 105, or via another communications network with which the server 115 is communicatively linked. In an arrangement in which the virtual shopping cart 130 is stored on a portable storage device, the terminal 165 can include an interface which enables the terminal 165 to read and write data to the storage device. For example, the terminal 165 can include a magnetic card reader/writer or a communications port.

Figure 2:
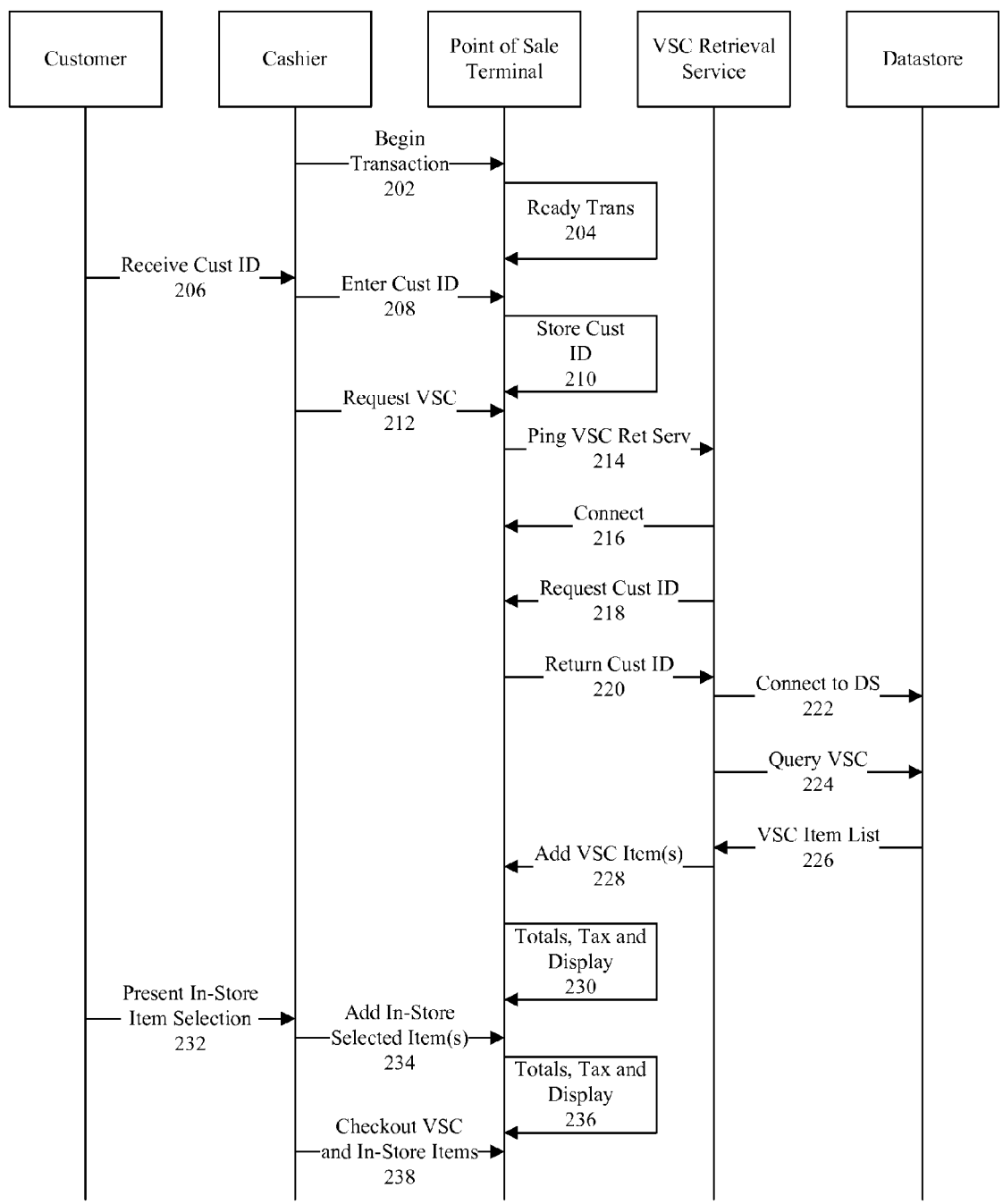
FIG. 2 is a flow diagram illustrating a method of processing a purchase transaction in accordance with another embodiment of the present invention.

FIG. 2 is a flow diagram 200 illustrating a method of processing a purchase transaction in accordance with another embodiment of the present invention. In step 202, a cashier can begin the sales transaction, for example by entering data into a point of sale terminal. In step 204 the point of sale terminal can ready the transaction. In step 206, the cashier can receive an identifier from the customer. For example, the customer can provide a portable storage device, such as a customer identifier card, or provide a verbal identifier, such as the customer's name, customer code, telephone number or the like. Proceeding to step 208, the cashier can enter the customer identifier into the point of sale terminal and at step 210 the customer identifier can be stored.

In step 212, the cashier can enter into the point of sale terminal a request for the customer's virtual shopping cart. In step 214, the point of sale terminal can ping the virtual shopping cart retrieval service (hereinafter "retrieval service") and in step 216 the retrieval service can establish a connection with the point of sale terminal. In step 218, the retrieval service can request the customer identifier. In step 220, the point of sale terminal can provide such identifier to the retrieval service. The customer identifier can be the customer identifier entered in step 208, or an identifier that correlates to the customer identifier entered in step 208.

In step 222, the retrieval service can connect to the datastore where the customer's virtual shopping cart is stored. In step 224, the retrieval service can query the datastore for a listing of items contained in the virtual shopping cart. In step 226, the datastore can provide a listing of items contained in the virtual shopping cart. In step 228, a list of the items in the virtual shopping cart can be provided the point of sale terminal. The customer can be queried whether she wishes to proceed with the purchase of such items and given the opportunity to remove items which she no longer wishes to purchase. In step 230, the price of the virtual shopping cart items can be totaled, their tax can be computed, and such information can be displayed.

In step 232, the customer can present to the cashier items selected while shopping in the store. In step 234, the in-store items can be added to the sales transaction. In step 236, the price of the in-store items can be totaled, their tax can be computed, and such information can be displayed. In step 238, the cashier can complete the checkout of the virtual shopping cart and in-store items.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method for conducting a sales transaction comprising:
   receiving at a terminal within a store a first identifier generated for a first item of merchandise selected by a customer while the customer is physically located within the store;
   responsive to identifying the user within the store, requesting from a virtual shopping cart associated with the user a list comprising at least a second identifier specifying a second item of merchandise previously selected by the user for purchase online;
   receiving from the virtual shopping cart the list comprising the at least a second identifier specifying the second item of merchandise; and
   processing the first item of merchandise and the second item of merchandise in a single sales transaction.

2. The method of claim 1, further comprising:
   receiving from a client at least one item selection; and
   adding the item selection to the virtual shopping cart;
   wherein the second identifier corresponds to the item selection.

3. The method of claim 2, further comprising:
   responsive to receiving the item selection from the client, adjusting an available inventory of the second item of merchandise.

4. The method of claim 1, further comprising receiving a customer identifier at the terminal, the customer identifier associating the customer with the second item of merchandise.

5. The method of claim 1, wherein receiving the second identifier comprises accessing a virtual shopping cart retrieval service via a communications network.

6. The method of claim 1, further comprising responsive to the single sales transaction conducted within the store, removing each identifier for an item of merchandise involved in the single sales transaction from the virtual shopping cart.

7. The method of claim 1, wherein receiving at the terminal the first identifier comprises scanning a bar code of the first item of merchandise with a mobile communication device.

8. The method of claim 1, further comprising:
   receiving from the customer via the communications network an appointment request; and scheduling an appointment in accordance with the appointment request.

9. A system for conducting a sales transaction within a store, the system comprising a terminal that receives a first identifier generated for a first item of merchandise selected by a customer while the customer is physically located within the store, responsive to identifying the user within the store, requests from a virtual shopping cart associated with the user a list comprising at least a second identifier specifying a second item of merchandise previously selected by the user for purchase online, receives from the virtual shopping cart the list comprising the at least a second identifier specifying the second item of merchandise, and processes the first item of merchandise and the second item of merchandise in a single sales transaction.

10. The system of claim 9, further comprising a server that receives from a client at least one item selection and adds the item selection to the virtual shopping cart, wherein the second identifier corresponds to the item selection.

11. The system of claim 10, further comprising an inventory control application that, responsive to receiving the item selection from the client, adjusts an available inventory of the second item of merchandise.

12. The system of claim 9, wherein the terminal receives a customer identifier that associates the customer with the second item of merchandise.

13. The system of claim 9, further comprising a virtual shopping cart retrieval service that is accessed by the terminal via a communications network.

14. The system of claim 9, wherein the terminal comprises a scanner that scans a bar code of the first item of merchandise.

15. The system of claim 9, wherein the terminal, responsive to the single sales transaction conducted within the store, removes each of identifier for an item of merchandise involved in the single sales transaction from the virtual shopping cart.

16. The system of claim 9, further comprising an appointment scheduling application that receives from the customer via the communications network an appointment request and schedules an appointment in accordance with the appointment request.

17. A machine readable storage having stored thereon a computer program having a plurality of code sections comprising:
   code for receiving at a terminal within a store a first identifier generated for a first item of merchandise selected by a customer while the customer is physically located within the store;
   code for, responsive to identifying the user within the store, requesting from a virtual shopping cart associated with the user a list comprising at least a second identifier specifying a second item of merchandise previously selected by the user for purchase online;
   code for receiving from the virtual shopping cart the list comprising the at least a second identifier specifying the second item of merchandise; and
   code for processing the first item of merchandise and the second item of merchandise in a single sales transaction.

18. The machine readable storage of claim 17, further comprising:
   code for receiving from a client at least one item selection; and
   code for adding the item selection to the virtual shopping cart;
   wherein the second identifier corresponds to the item selection.

19. The machine readable storage of claim 17, further comprising code for receiving a customer identifier at the terminal, the customer identifier associating the customer with the second item of merchandise.

20. The machine readable storage of claim 17, wherein the code for receiving the second identifier comprises code for accessing a virtual shopping cart retrieval service via a communications network.

* * * * *